United States Patent [19]

Abdul-Halim

[11] Patent Number: 5,604,492
[45] Date of Patent: Feb. 18, 1997

[54] APPARATUS AND METHOD FOR DIRECTORY-LINKED CANNED PAGER MESSAGES

[75] Inventor: Ahmad H. Abdul-Halim, Alor Star, Malaysia

[73] Assignee: Motorola, Inc., Schaumburg, Ill.

[21] Appl. No.: 508,933

[22] Filed: Jul. 28, 1995

Related U.S. Application Data

[63] Continuation of Ser. No. 290,166, Aug. 15, 1994, abandoned.

[51] Int. Cl.$^6$ .................... G08B 5/22; H04Q 1/00
[52] U.S. Cl. ................. 340/825.44; 379/142; 340/311.1; 455/32.1
[58] Field of Search ................ 340/825.44, 311.1, 340/825.69, 825.72, 825.47, 825.37; 379/142; 455/158.5, 32.1

[56] References Cited

U.S. PATENT DOCUMENTS

| | | | |
|---|---|---|---|
| 4,263,480 | 4/1981 | Levine | 379/57 |
| 4,336,524 | 6/1982 | Levine | 340/311.1 |
| 4,818,987 | 4/1989 | Ide et al. | 340/825.25 |
| 4,951,043 | 8/1990 | Minami | 340/825.44 |
| 5,267,307 | 11/1993 | Izumi et al. | 379/142 |
| 5,341,414 | 8/1994 | Popke | 379/142 |
| 5,347,574 | 9/1994 | Morganstein | 379/142 |
| 5,351,285 | 9/1994 | Katz | 379/142 |

*Primary Examiner*—Alyssa H. Bowler
*Assistant Examiner*—Mark H. Rinehart
*Attorney, Agent, or Firm*—R. Louis Breeden

[57] ABSTRACT

A method and apparatus for displaying directory-linked canned messages on a display (20) of a portable device (10) having selective call receiving functions. A personal name directory (100) is stored in the device (10). The name directory (100) comprises a plurality of entries (102), each entry comprising at least one telephone number and at least one canned message corresponding to the at least one telephone number. A paging message including a telephone number is received by the portable device (10). The personal name directory (100) is searched to determine if the telephone number received in the paging message matches with a telephone number in any of the personal name directory entries (102). If there is a match, the canned message which corresponds to the personal name directory entry that matches the telephone number received in the paging message is displayed. Otherwise, a default message is displayed.

11 Claims, 5 Drawing Sheets

PERSONAL NAME DIRECTORY

*102*

| NAME | TELEPHONE NUMBER(S) | ADDRESS |
|---|---|---|
| JOHN DOE | 123-4567 (W) | XXXX |
| | 221-4545 (H) | |

PAGER MESSAGE
STANDARD

*102*

| NAME | TELEPHONE NUMBERS(S) | ADDRESS |
|---|---|---|
| BILL SMITH | 442-9500 (W1) | XXXX |
| | 223-4495 (W2) | |
| | 941-0412 (H) | |

PAGER MESSAGE
PERSONALIZED
"BILL SMITH OF XYZ. CORP.,
BALL BEARINGS DEAL"

APPARATUS AND METHOD FOR DIRECTORY-LINKED CANNED PAGER MESSAGES

This is a continuation of application Ser. No. 08/290,166 filed on Aug. 15, 1994, now abandoned.

FIELD OF THE INVENTION

The present invention relates to a selective call receiver, and more particularly to a selective call receiver featuring directory-linked canned messaging.

BACKGROUND OF THE INVENTION

Portable selective call receivers (pagers) are widely used to communicate various types of messages. One type of pager, called a numeric pager, displays primarily the telephone number entered by the paging party. Often, the user of the pager receives pages from many parties, and cannot identify the party based on a received telephone number. The pager user sometimes delays returning the call when the received telephone number is not familiar. In a worse case, the page message is totally ignored because the displayed telephone number is not recognized.

Efforts have been made in an attempt to solve this problem. See, for example, U.S. Pat. Nos. 4,336,524 and 4,267,480. These patents are directed to a technique known as "canned messaging" in which a short code is transmitted to a pager, and in the pager a message corresponding to the code is displayed. However, a disadvantage of this canned message technique is that the code needs to be memorized, or at least recalled, by the party sending the page. Furthermore, for practical applications, the canned messages are limited to a standard list.

Recently, portable electronic devices have evolved to include many diverse functions, such as, for example, personal organizer devices with communication functions like paging and electronic mail. With the advent of the combined functions in portable electronic devices, certain communication features can be realized more efficiently.

SUMMARY OF THE INVENTION

In accordance with one aspect of the present invention, a method is provided for displaying directory-linked canned messages on a display of a portable device having selective call receiving functions, the method comprising steps of:

storing in a memory of the portable device a personal name directory having a plurality of entries, each entry comprising at least one telephone number and at least one canned message corresponding to the at least one telephone number;

receiving a paging message including a telephone number;

searching through the personal name directory to determine if the telephone number received in the paging message matches with a telephone number in any of the personal name directory entries; and displaying on a display of the portable device a canned message which corresponds to the personal name directory entry that matches the telephone number received in the paging message.

In accordance with another aspect of the present invention, a selective call receiver is provided comprising a receiver for receiving a radio frequency paging signal; circuitry for decoding the received radio frequency paging signal to extract a paging message from the radio frequency paging signal, the paging message including a telephone number of a party who sent the paging message; and a display for displaying a message; the improvement comprising:

a memory storing a personal name directory comprising a plurality of entries, each entry comprising at least one telephone number and at least one canned message associated with the at least one telephone number;

a controller for searching the personal name directory to determine a match between the telephone number in the received paging message and a telephone number in any of the entries of the personal name directory for displaying on the display a canned message of the personal name directory entry corresponding to the telephone number in the received paging message or displaying a canned default message indicating that the telephone number in the received paging message is not in the personal name directory entries.

BRIEF DESCRIPTION OF THE DRAWINGS

FIG. 6 is a table representative of data stored in a personal name directory of the selective call receiver/personal organizer in accordance with the present invention.

DESCRIPTION OF A PREFERRED EMBODIMENT

Figure 1:
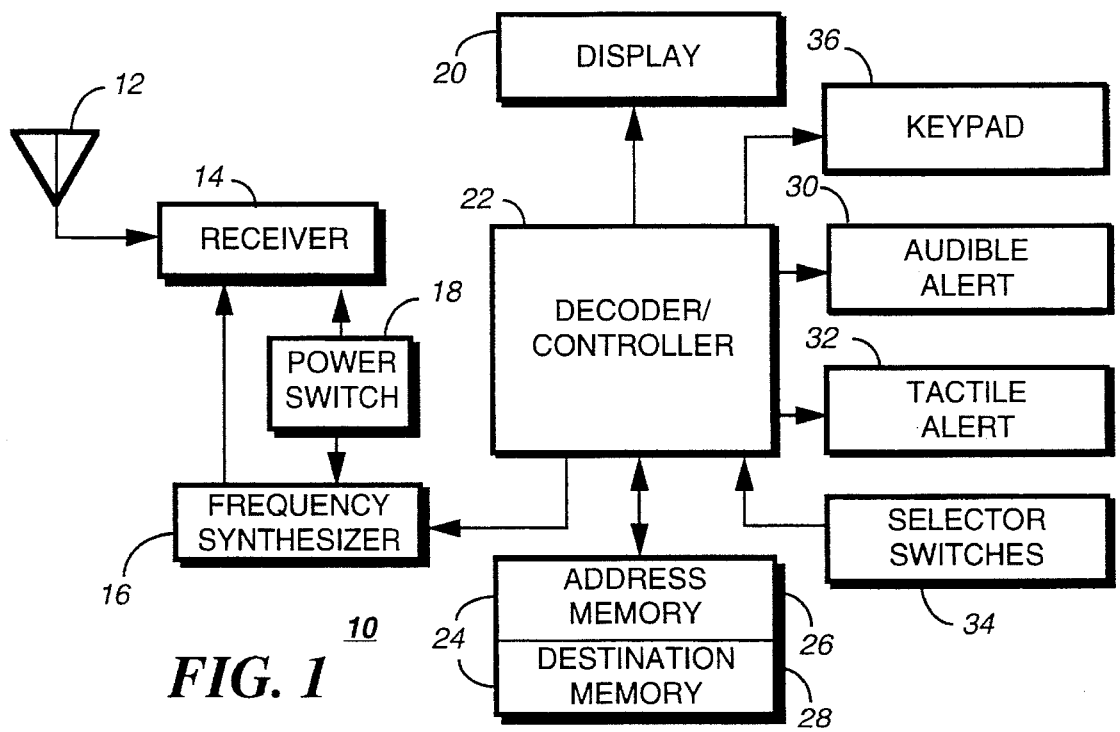
FIG. 1 is a block diagram of a combination selective call receiver/personal organizer in accordance with the present invention.

Referring to FIG. 1, a selective call receiver/personal organizer (pager/personal organizer) according to the present invention is generally shown at 10. The pager/personal organizer (PPO) 10 comprises many components which are well known in the art of pagers, such as the antenna 12, receiver 14, frequency synthesizer 16, power switch 18, display 20, decoder/microcontroller 22, code plug 24 having an address memory 26 and a destination memory 28, audible alert 30, tactile alert 32 and selector switches 34. At a minimum, the PPO 10 includes the ability to receive, decode and display numeric paging messages.

In addition, the PPO 10 includes a keypad 36 for entering data into the personal organizer portion of the PPO 10. The personal organizer portion of the PPO 10 is generated by software stored in the decoder/microcontroller 22. In fact, the selector switches 34 may be replaced completely by the keypad 36. The keypad 36 is preferably a miniaturized alphanumeric keypad or is alternatively embodied as a virtual keypad displayed by the display 20, and capable of accepting pen input, as is well known in the art.

In this regard, the display 20 is for example, 4 lines, with 16–20 characters per line. However, larger or smaller sized displays are optionally provided in the PPO 10 according to the present invention.

Figure 2:
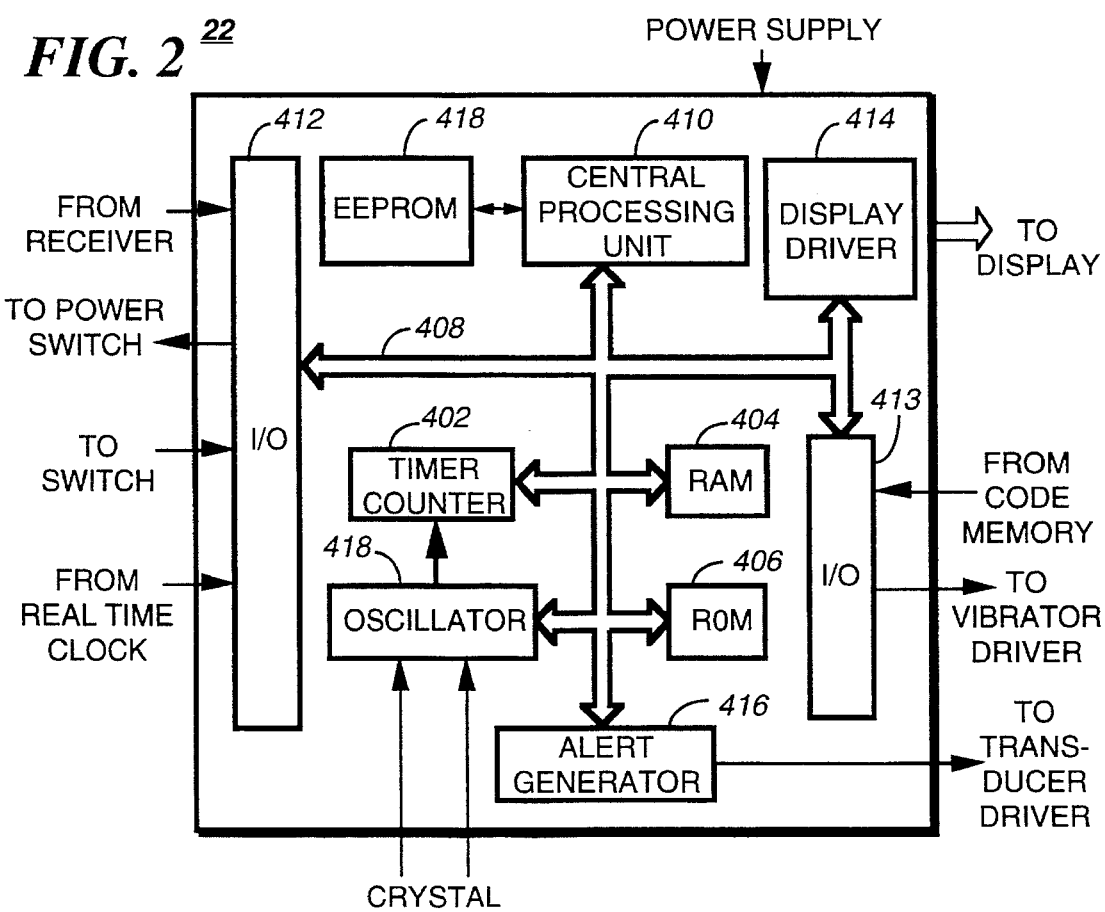
FIG. 2 is an electrical block diagram of a microcontroller of the combination selective call receiver/personal organizer in accordance with the present invention.

The decoder/microcontroller 22 is shown in greater detail in FIG. 2. The decoder/microcontroller 22 comprises many components which are well known in the art, including timer counter 402, RAM 404, ROM 406, bus 408, central processing unit 410, I/O ports 412 and 413, display driver 414 and alert generator 416. The decoder/microcontroller 22 controls the functions of the personal organizer portion and paging portion, and therefore, it is preferably more powerful than one in a conventional pager. For example, the microcontroller is a HC11 microprocessor, made by Motorola, Inc., or another similar microprocessor/microcontroller.

In addition, the microcontroller 22 optionally includes an EEPROM 418 (electronically erasable read only memory). The EEPROM 418 is used to store the personal organizer applications, if it is chosen to provide a ROM 406 not large enough to store the personal organizer applications. However, memory space of approximately 512 K bytes is likely sufficient to perform most personal organizer functions.

Figure 3:
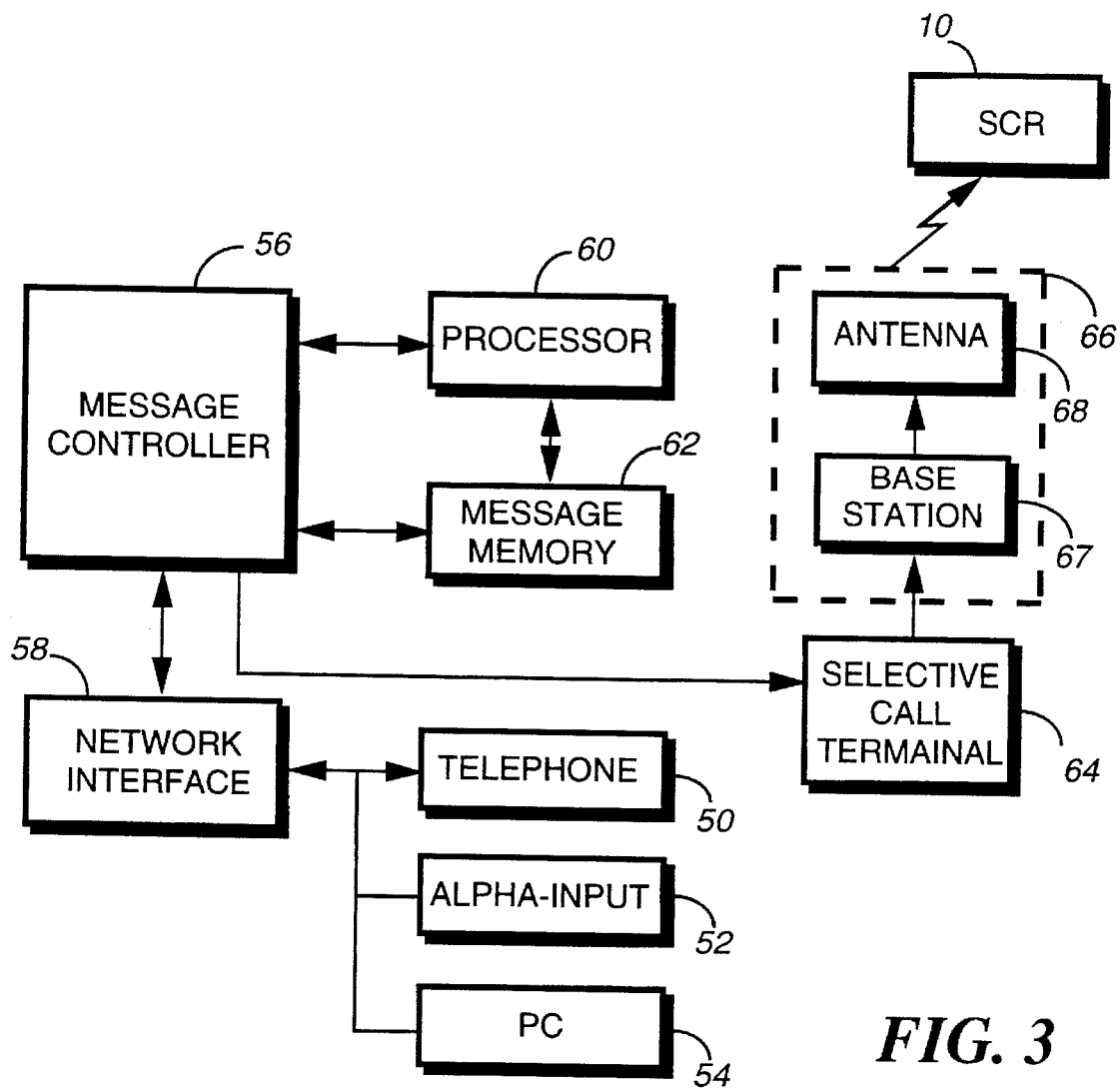
FIG. 3 is a block diagram of a selective call receiver communication system.

FIG. 3 illustrates a conventional selective call receiving system in which messages from a telephone 50, alpha-input device 52 or personal computer 54 are processed and transmitted to one or more selective call receivers 10, which in accordance with the present invention are PPO's. The messages include the telephone number of the paging party. The messages are received by a message controller 56 via a network interface 58, such as the public telephone network. The messages are temporarily stored in message memory 62 and processed by processor 60 to be transmitted in a batch paging signal, as is well known in the art. The batch paging signal is fed through a selective call terminal 64 and transmitted via a transmitter station 66 which includes a base station 67 and an antenna 68.

Figure 4:
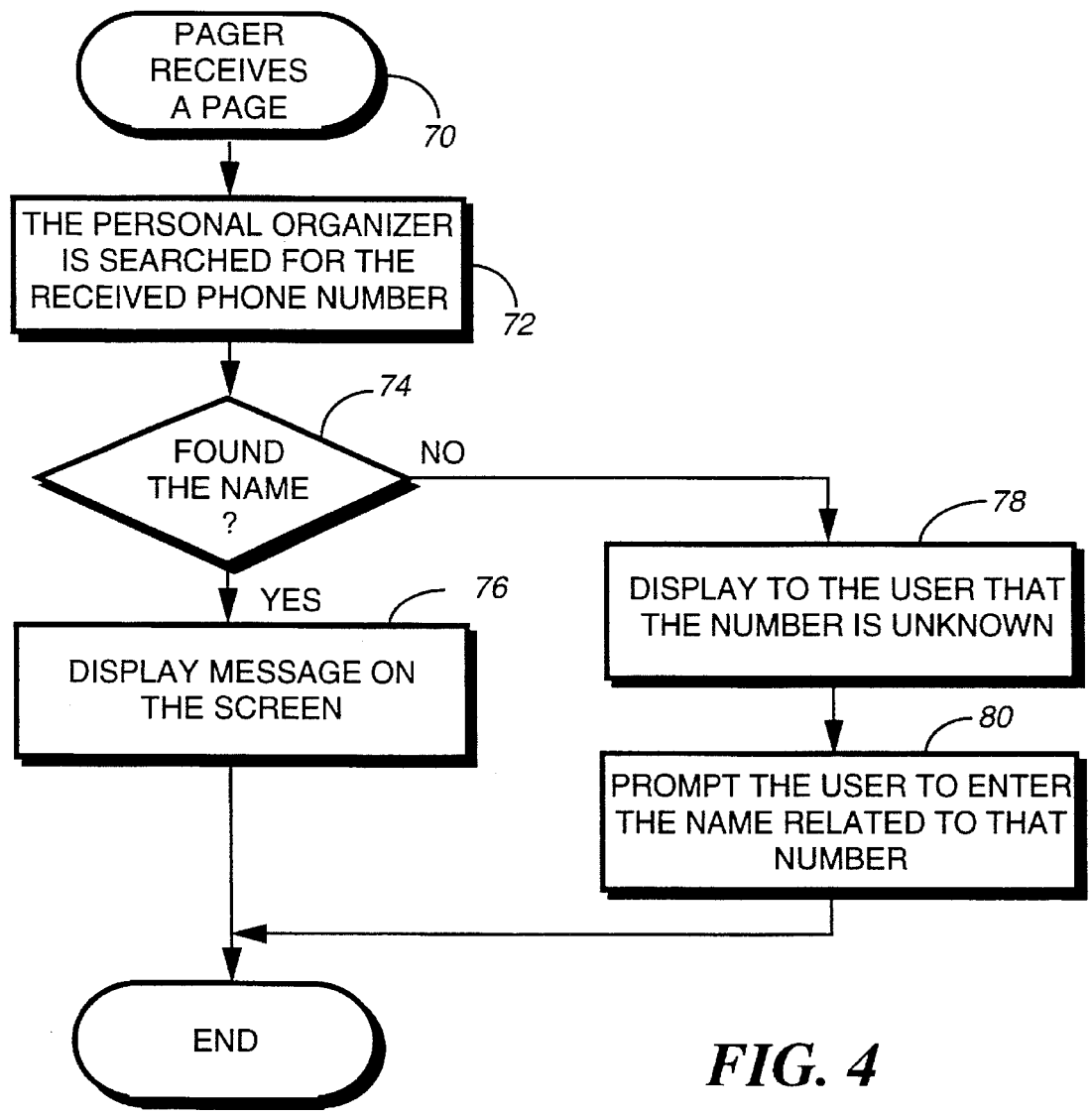
FIG. 4 is a flow diagram illustrating the directory linked canned message methodology in accordance with the present invention.

Turning now to FIG. 4, the method for displaying a directory-linked canned message will be explained. Step 70 represents the occurrence of a pager receiving a paging message including a telephone number sent in the numeric paging message. In step 72, a personal name directory (FIG. 6) in the personal organizer is searched on the basis of the received telephone number. In step 74, if an entry in the personal name directory having a stored telephone number matching the received telephone number is found, then the message stored in the directory file associated with that entry is displayed in step 76 on the PPO display. If in step 74, it is determined that no entry in the personal name directory matches the telephone number received in the paging message, then in step 78 a message is displayed on the PPO display to the user that the received number is not known. Next, in step 80 a message is displayed on the PPO display prompting the user to enter a name and canned message for the new received telephone number.

Figure 5:
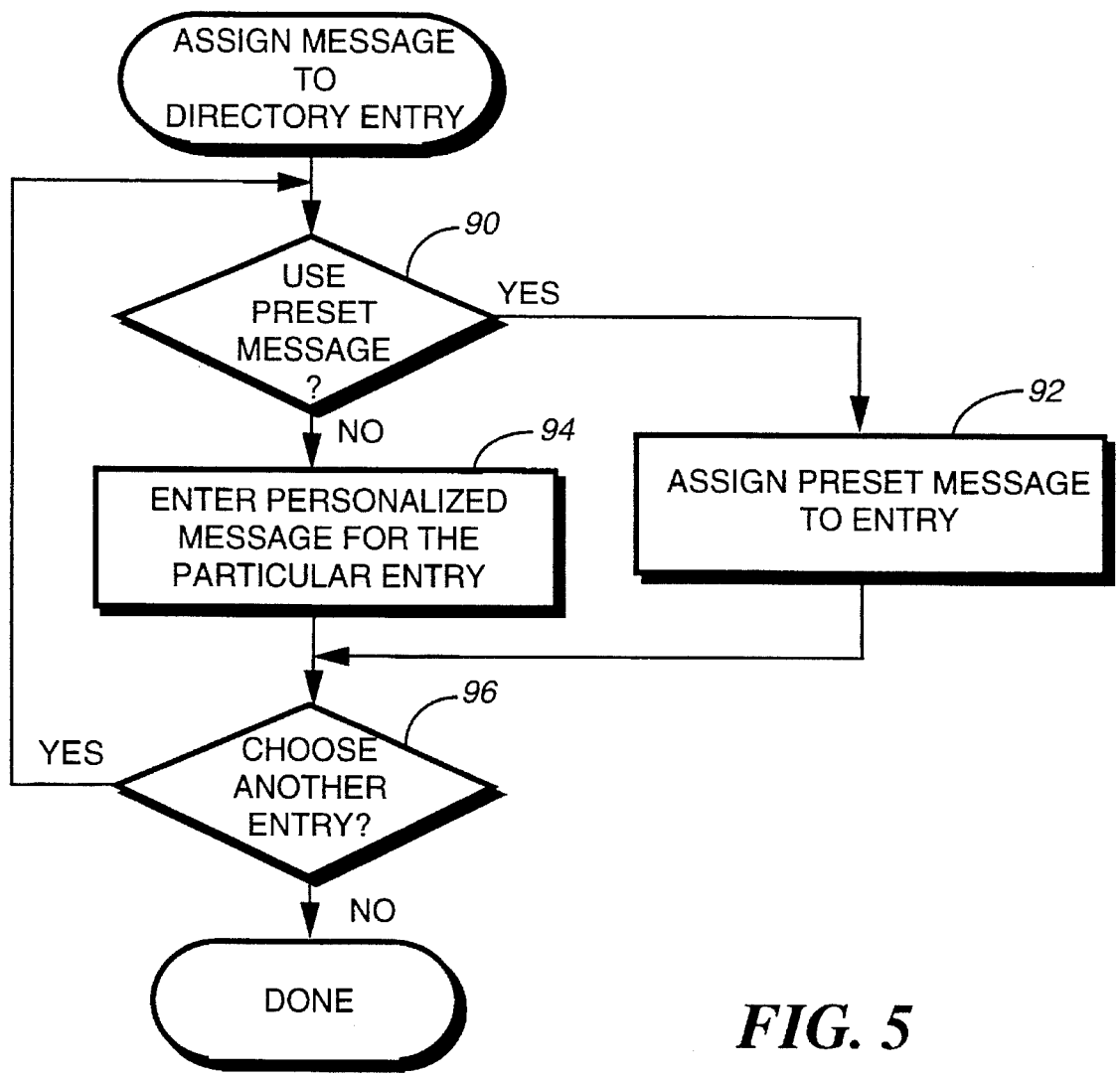
FIG. 5 is a flow diagram illustrating a method for assigning canned messages in accordance with the present invention.

FIG. 5 illustrates a procedure for entering a personalized or generic canned message to a name in the personal name directory. In this manner, when a telephone number is received which corresponds to the name, the stored canned message, personalized or generic, for that name is displayed. The procedure shown in FIG. 5 is activated when the user wishes to assign or alter a stored canned message for a particular name in the personal name directory. The name or telephone number corresponding to a particular party that sends paging messages to the user is assumed already entered into the file, such as by way of step 80 of FIG. 4.

In step 90, a message is displayed on the PPO display prompting the user to enter a preset message for the name entry selected (scrolled to) in the name file. If the user replies by keypad entry to use a preset message, then in step 92 a preset message is assigned to the name entry. If not, then in step 94, the user may enter by keypad a personalized message of a maximum character length for the particular name entry. This personalized canned message is stored in memory associated with the name entry in the personal name directory. In step 96, the user is given a prompting message to select another name entry for message assignment. A default message is stored such that if the search through the name directory does not result in a match, then the following default message, for example, is displayed on the PPO display:

UNKNOWN OF 442-9999 CALLED AT 3:00 PM Mar. 15, 1994
DO YOU WANT TO ADD TO NAME DIRECTORY?

FIG. 6 shows an example of a personal name directory 100 maintained by the personal organizer portion of the PPO. In this directory, the user stores information about various parties, such as business contacts, etc., including the telephone numbers of the parties and address information. As shown, each entry 102 may include several telephone numbers, such as multiple business numbers and home numbers. In addition, the name directory allots a space to indicate the type of directory-linked canned message that should be displayed when a page message including one of the corresponding telephone numbers is received by the PPO.

For example, the name entry "John Doe" is shown to have a standard or generic message. The generic message is, for example:

JOHN DOE of 123-4567 CALLED AT 2:00 PM Jan. 1, 1994

Certain portions of the canned message are standardized "fill-ins" such as the date and time that the message is received. Each time a message is received, a date and time is tagged onto it, and this information is filled into the canned message.

The name entry "Bill Smith", on the other hand, includes a specialized or personalized message which, when displayed reads:

BILL SMITH OF XYZ, CORP. BALL BEARINGS DEAL
CALLED AT 3:00 PM Jul. 1, 1994

No matter what type of directory-linked canned message is displayed, FIG. 6 shows that more than one telephone number of a particular name entry can trigger the display of the message. Therefore, so long as the paging party transmits a message with one of the numbers stored in the personal name directory, the appropriate message will be displayed. Changes are made to the name directory to keep current with the changing data of parties that page the user.

The PPO is a paging device which has personal data assistant functions, such as, a personal organizer including a personal name directory, address book, or equivalent, as well as selective call receiver (pager) functions. On the one hand, the pager functions are optionally provided by way of a PCMCIA (personal computer memory card international standard) or other similar device, removable from a host personal digital assistant. On the other hand, the personal organizer functions are optionally provided by way of a PCMCIA card in a portable device having paging functions.

The above description is intended by way of example only and is not intended to limit the present invention in any way except as set forth in the following claims.

What is claimed is:

1. A method for displaying messages on a display of a portable device having selective call receiving functions, the method comprising steps of:

storing in a memory of the portable device a personal name directory having a plurality of entries, each entry comprising at least one telephone number and at least one canned message corresponding to the at least one telephone number;

receiving a paging message including a telephone number;

searching through the personal name directory to determine if the telephone number received in the paging message matches with a telephone number in any of the personal name directory entries;

displaying on a display of the portable device a canned message which corresponds to the personal name directory entry that matches the telephone number received in the paging message; and displaying on the display of the portable device a message prompting a user to assign a message entry for the telephone number received in the paging message, if the telephone number received in the paging message does not match any telephone number in the personal name directory.

2. The method of claim 1, further comprising the step of:

if the telephone number received in the paging message does not match a telephone number in the personal name directory, displaying on a display of the portable device a message indicating that an unknown party sent the corresponding paging message.

3. The method of claim 1, wherein the step of storing further comprises assigning a standard canned message to a message entry or creating a personalized canned message for a message entry.

4. A portable communication device comprising:

means for receiving a radio frequency paging signal;

means for extracting a paging message from the radio frequency paging signal, the paging message including a telephone number of a party that sent the paging message;

means for storing a personal name directory comprising a plurality of entries, each entry comprising at least one telephone number and at least one canned message associated with the at least one telephone number;

means for searching the personal name directory to determine a match between the telephone number in the received paging message and a telephone number in any of the entries of the personal name directory; and means for displaying a canned message of the personal name directory entry corresponding to the telephone number in the received paging message, wherein the means for displaying further displays a message prompting a user to create an entry for the telephone number received in the paging message if the telephone number received in the paging message does not match a telephone number in the personal name directory.

5. The device of claim 4, wherein said means for storing stores a default canned message for display when the telephone number in the received paging message does not match a telephone number in the personal name directory.

6. The device of claim 4, further comprising input means for inputting alphanumeric characters into the personal name directory.

7. The device of claim 6, wherein the means for storing further stores a standard canned message or a personalized canned message created by a user and input by said input means for a message entry.

8. The device of claim 4, wherein the portable communication device is a selective call receiver.

9. In a selective call receiver comprising means for receiving a radio frequency paging signal; means for extracting a paging message from the radio frequency paging signal, the paging message including a telephone number of a party who sent the paging message; display means for displaying a message; the improvement comprising:

means for storing a personal name directory comprising a plurality of entries, each entry comprising at least one telephone number and at least one canned message associated with the at least one telephone number;

means for searching the personal name directory to determine a match between the telephone number in the received paging message and a telephone number in any of the entries of the personal name directory for displaying on the display means a canned message of the personal name directory entry corresponding to the telephone number in the received paging message or displaying a canned default message indicating that the telephone number in the received paging message is not in the personal name directory entries and further displaying a message prompting a user to create an entry for the telephone number received in the paging message.

10. The improvement of claim 9, further comprising input means for inputting alphanumeric characters.

11. The improvement of claim 10, wherein the means for storing further stores a standard canned message or a personalized canned message created by a user and input by said input means for a message entry.

\* \* \* \* \*